(12) United States Patent
Chiu et al.

(10) Patent No.: US 8,487,574 B2
(45) Date of Patent: Jul. 16, 2013

(54) FAN ROTARY SPEED CONTROLLING DEVICE

(75) Inventors: Chin-Fa Chiu, Taoyuan Hsien (TW); Chung-Hung Tang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 246 days.

(21) Appl. No.: 12/984,209

(22) Filed: Jan. 4, 2011

(65) Prior Publication Data

US 2012/0086378 A1 Apr. 12, 2012

(30) Foreign Application Priority Data

Oct. 11, 2010 (TW) .............................. 099134562 A

(51) Int. Cl.
*H02P 1/04* (2006.01)
*H02P 3/00* (2006.01)
(52) U.S. Cl.
USPC ........... 318/463; 318/268; 318/432; 318/471; 318/400.13
(58) Field of Classification Search
USPC ................... 318/463, 432, 471, 268, 400.13, 318/254, 400.26, 811; 165/121; 327/1; 388/811
See application file for complete search history.

(56) References Cited

U.S. PATENT DOCUMENTS

| | | | | |
|---|---|---|---|---|
| 6,040,668 | A * | 3/2000 | Huynh et al. | 318/471 |
| RE37,589 | E * | 3/2002 | Mueller | 318/400.26 |
| 6,621,242 | B2 * | 9/2003 | Huang et al. | 318/268 |
| 7,646,115 | B2 * | 1/2010 | Illegems | 307/80 |
| 7,667,512 | B2 * | 2/2010 | Alberkrack et al. | 327/172 |
| 7,915,843 | B2 * | 3/2011 | Mishima et al. | 318/400.13 |
| 8,093,846 | B2 * | 1/2012 | Mishima et al. | 318/400.13 |
| 8,093,848 | B2 * | 1/2012 | Suzuki | 318/432 |
| 2003/0062863 | A1 * | 4/2003 | Huang et al. | 318/268 |
| 2007/0001643 | A1 * | 1/2007 | Buerk et al. | 318/811 |
| 2007/0120510 | A1 * | 5/2007 | Wang | 318/268 |
| 2007/0121356 | A1 * | 5/2007 | Lee | 363/131 |
| 2007/0138984 | A1 * | 6/2007 | Yang et al. | 318/254 |
| 2008/0164765 | A1 * | 7/2008 | Illegems | 307/80 |
| 2008/0238487 | A1 * | 10/2008 | Alberkrack et al. | 327/1 |
| 2008/0240688 | A1 * | 10/2008 | Alberkrack et al. | 388/811 |
| 2009/0184672 | A1 * | 7/2009 | Suzuki | 318/400.13 |
| 2011/0139412 | A1 * | 6/2011 | Mishima et al. | 165/121 |

\* cited by examiner

*Primary Examiner* — Paul Ip

(74) *Attorney, Agent, or Firm* — Muncy, Geissler, Olds & Lowe, PLLC

(57) ABSTRACT

A fan rotary speed controlling device includes a base voltage generating circuit, a first voltage generating circuit, a second voltage generating circuit and a compensation controlling circuit. The base voltage generating circuit receives a pulse width modulation signal and outputs a base voltage signal. The first voltage generating circuit receives the pulse width modulation signal and generates a first voltage signal according to the pulse width modulation signal. The second voltage generating circuit receives a fan rotary speed signal and generates a second voltage signal according to the fan rotary speed signal. The compensation controlling circuit outputs a voltage deviation compensation signal according to the first voltage signal and the second voltage signal. Hence, the fan rotary speed controlling device provides a stable rotary speed.

11 Claims, 2 Drawing Sheets

FAN ROTARY SPEED CONTROLLING DEVICE

CROSS REFERENCE TO RELATED APPLICATIONS

This Non-provisional application claims priority under 35 U.S.C. §119(a) on Patent Application No(s). 099134562 filed in Taiwan, Republic of China on Oct. 11, 2010, the entire contents of which are hereby incorporated by reference.

BACKGROUND OF THE INVENTION

1. Field of Invention

The present invention relates to a controlling device and, in particular, to a fan rotary speed controlling device.

2. Related Art

The fans are usually used for heat dissipation. They can be installed in the electronic products for extending the lifespan and cleanness of the products, or they can be used for decreasing the temperature of some environment, so that fans have become an indispensable kind of electronic products in current life.

In the conventional fans, the fan rotary speed is usually controlled by a pulse width modulation (PWM) signal and the duty cycle of the waveform is used to control the ratio of ON-OFF of the switching element (e.g. a transistor) in a unit time, thereby controlling the current value of the load. Accordingly, the small signal can directly control the fan rotary speed instead of changing the inputted voltage of the fan. FIG. 1 is a schematic diagram showing a conventional fan rotary speed controlling device 1. As shown in FIG. 1, an external voltage V1 (power source) is applied to the fan rotary speed controlling device 1 for driving it. In addition, a PWM signal S1 is inputted to the controlling circuit 11 for controlling the rotary speed of the fan motor 7.

However, the conventional fan rotary speed controlling device is easily affected by the changes or unstable of the inputted external voltage and the difference of air resistances, which may cause the variation of the fan rotary speed under the same PWM duty cycle. Therefore, it is an important subject to provide a fan rotary speed controlling device that can provide stable rotary speed without being interfered by air resistances.

SUMMARY OF THE INVENTION

In view of the foregoing subject, an objective of the present invention is to provide a fan rotary speed controlling device that can provide stable rotary speed.

To achieve the above objective, the present invention discloses a fan rotary speed controlling device including a base voltage generating circuit, a first voltage generating circuit, a second voltage generating circuit and a compensation controlling circuit. The base voltage generating circuit receives a pulse width modulation (PWM) signal and outputs a base voltage signal. The first voltage generating circuit is electrically connected to the base voltage generating circuit for receiving the pulse width modulation signal and generating a first voltage signal according to the pulse width modulation signal. The second voltage generating circuit receives a fan rotary speed signal and generates a second voltage signal according to the fan rotary speed signal. The compensation controlling circuit is electrically connected to the first voltage generating circuit and the second voltage generating circuit for receiving the first voltage signal and the second voltage signal. Herein, the compensation controlling circuit outputs a voltage deviation compensation signal according to the first voltage signal and the second voltage signal.

In one embodiment of the present invention, the compensation controlling circuit includes an operation amplifier, which outputs a voltage amplified signal according to the first voltage signal and the second voltage signal.

In one embodiment of the present invention, the fan rotary speed controlling device further includes a controlling circuit electrically connected to the base voltage generating circuit and the compensation controlling circuit. The controlling circuit outputs a rotary speed adjusting signal according to the base voltage signal and the voltage deviation compensation signal.

In one embodiment of the present invention, the fan rotary speed controlling device further includes a fan rotary speed sensing circuit for transmitting the fan rotary speed signal to the second voltage generating circuit.

As mentioned above, the fan rotary speed controlling device of the present invention compares the first and second voltage signals respectively generated by the first and second voltage generating circuits. Consequently, the compensation controlling circuit can determine whether to compensate the rotary speed and then output a voltage deviation compensation signal for compensating the base voltage signal, so as to adjust the rotary speed of the fan. Thus, the fan rotary speed controlling device of the present invention can control the motor to reach a stable rotary speed without being interfered by the air resistances and external voltage variations.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
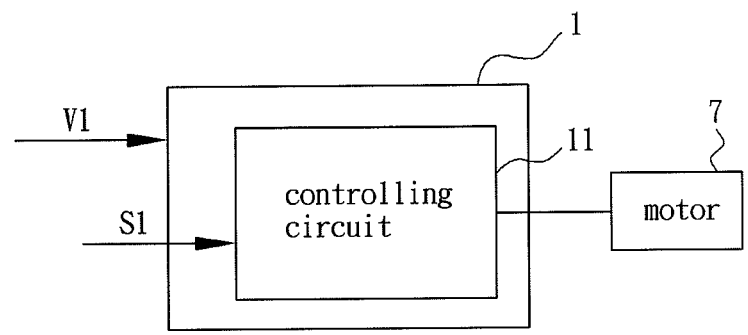
FIG. 1 is a schematic diagram showing a conventional fan rotary speed controlling device.
Figure 2:
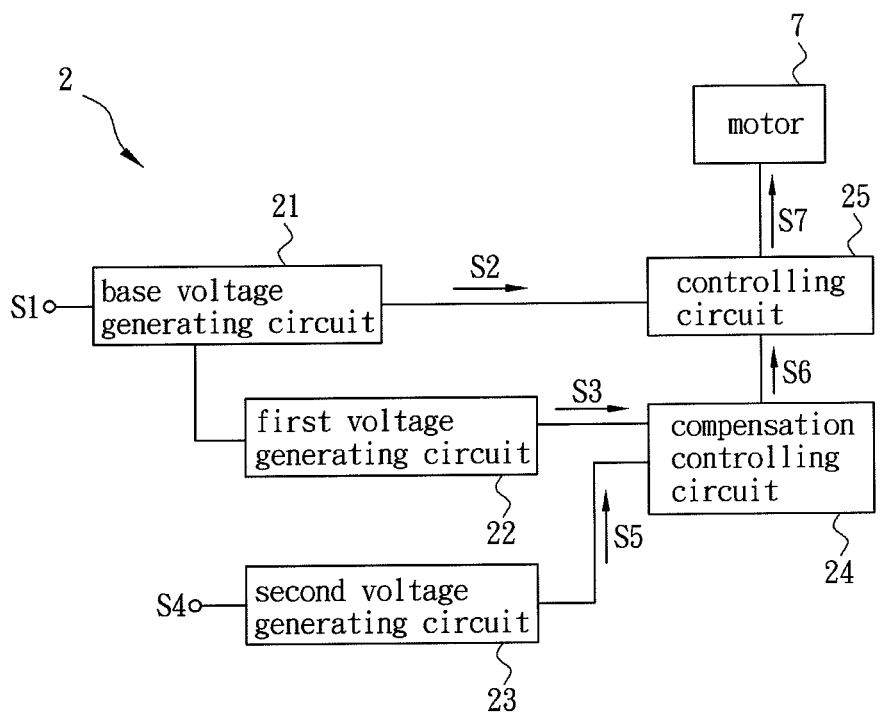
FIG. 2 is a schematic diagram showing a fan rotary speed controlling device according to a preferred embodiment of the present invention.

FIG. 2 is a schematic diagram showing a fan rotary speed controlling device 2 according to a preferred embodiment of the present invention. Referring to FIG. 2, the fan rotary speed controlling device 2 is used for controlling the rotary speed of a motor 7. The fan rotary speed controlling device 2 includes a base voltage generating circuit 21, a first voltage generating circuit 22, a second voltage generating circuit 23, a compensation controlling circuit 24 and a controlling circuit 25.

The base voltage generating circuit 21 receives a pulse width modulation (PWM) signal S1 and outputs a base voltage signal S2. In this embodiment, when the PWM duty cycle of the PWM signal S1 is larger, the voltage of the base voltage signal S2 is smaller. On the contrary, when the PWM duty cycle of the PWM signal S1 is smaller, the voltage of the base voltage signal S2 is larger.

The first voltage generating circuit 22 is electrically connected to the base voltage generating circuit 21 for receiving the PWM signal S1 and generating a first voltage signal S3 by converting the PWM signal S1 into a DC signal. In this embodiment, when the PWM percentage in the PWM signal S1 is larger, the voltage of the first voltage signal S3 is higher. On the contrary, when the PWM percentage in the PWM signal S1 is smaller, the voltage of the first voltage signal S3 is lower.

The second voltage generating circuit 23 receives a fan rotary speed signal S4 and generates a second voltage signal S5 according to the fan rotary speed signal S4. In this case, the fan rotary speed signal S4 represents the real rotary speed of the fan. Thus, when the fan rotary speed is faster, the voltage of the second voltage signal S5 is higher; on the contrary, when the rotary speed is slower, the voltage of the second voltage signal S5 is lower.

The compensation controlling circuit 24 is electrically connected to the first voltage generating circuit 22 and the second voltage generating circuit 23 for receiving the first voltage signal S3 and the second voltage signal S5. In addition, the compensation controlling circuit 24 can output a voltage deviation compensation signal S6 according to the first voltage signal S3 and the second voltage signal S5. In this embodiment, when the first voltage signal S3 and the second voltage signal S5 are different, the voltage deviation compensation signal S6 is outputted to determine the deviation between the real rotary speed and the target rotary speed.

The controlling circuit 25 is electrically connected to the base voltage generating circuit 21 and the compensation controlling circuit 24 for receiving the base voltage signal S2 and the voltage deviation compensation signal S6. Then, the controlling circuit 25 outputs a rotary speed adjusting signal S7 according to the base voltage signal S2 and the voltage deviation compensation signal S6, thereby controlling the rotary speed of the fan motor 7.

Figure 3:
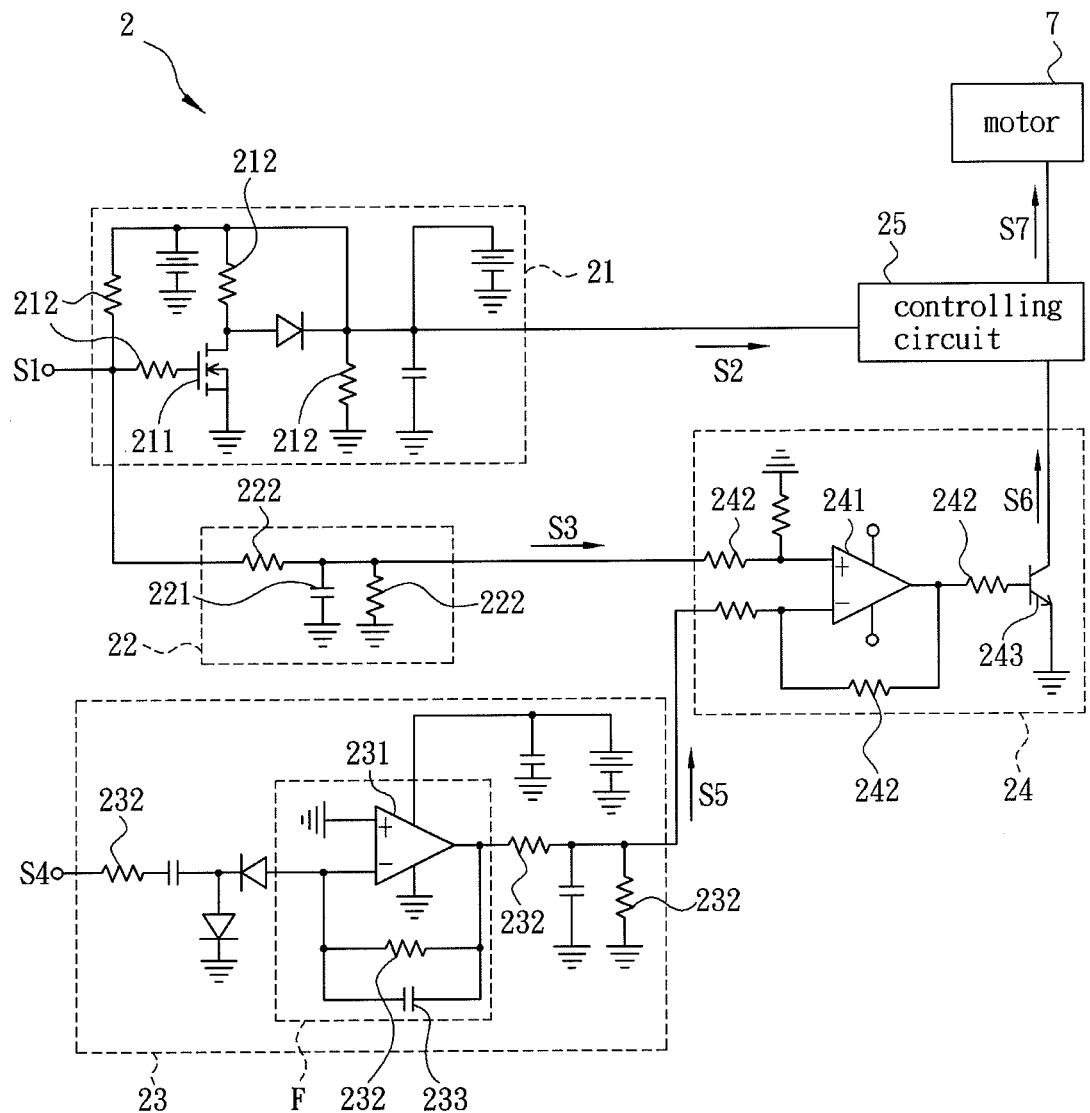
FIG. 3 is a circuit diagram of the fan rotary speed controlling device of FIG. 2.

FIG. 3 is a circuit diagram of the fan rotary speed controlling device of FIG. 2. The structures and operations of the base voltage generating circuit 21, the first voltage generating circuit 22, the second voltage generating circuit 23, the compensation controlling circuit 24 and the controlling circuit 25 will be described herein after with reference to FIG. 3. To be noted, the structure shown in FIG. 3 is used for illustration only and is not to limit the scope of the invention.

The base voltage generating circuit 21 may include a P-type transistor or an N-type transistor. In this embodiment, the base voltage generating circuit 21 includes an N-type field-effect transistor 211 for example. The gate of the transistor 211 receives the PWM signal S1, and then the transistor 211 and a plurality of resistors 212 of the base voltage generating circuit 21 can divide the PWM signal S1 to output a base voltage signal S2, which is a DC signal. In this embodiment, when the PWM duty cycle of the PWM signal S1 is larger, the voltage of the base voltage signal S2 is smaller. On the contrary, when the PWM duty cycle of the PWM signal S1 is smaller, the voltage of the base voltage signal S2 is larger.

The first voltage generating circuit 22, which is electrically connected to the base voltage generating circuit 21, includes a capacitor 221 and a plurality of resistors 222. The first voltage generating circuit 22 receives the PWM signal S1 and generates the first voltage signal S3 (a DC signal) according to the PWM signal S1. In this embodiment, when the PWM percentage in the PWM signal S1 is larger, the voltage of the first voltage signal S3 is higher. On the contrary, when the PWM percentage in the PWM signal S1 is smaller, the voltage of the first voltage signal S3 is lower.

The fan rotary speed controlling device of the present invention further includes a fan rotary speed sensing circuit (not shown). The fan rotary speed sensing circuit includes a fan rotary speed sensor for sensing the rotary speed of the operating fan and generating a fan rotary speed signal S4, which is transmitted to the second voltage generating circuit 23. In this embodiment, the fan rotary speed sensor can be a Hall sensor or an optical coupler, which can obtain the rotary speed by detecting the motor 7. Alternatively, the rotary speed sensor can also be a tachometer, which can obtain the rotary speed by detecting the blades or impeller. In addition, the waveform of the fan rotary speed signal S4 can be a square wave or a sine wave. The cycle of the fan rotary speed signal S4 is constant, and the amplitude thereof is depending on the rotary speed.

The second voltage generating circuit 23 includes a low-pass filter F for receiving the fan rotary speed signal S4. The low-pass filter F includes an operation amplifier 231, a resistor 232, and a capacitor 233, which are connected in parallel. The inverting input end of the operation amplifier 231 receives the fan rotary speed signal S4. The resistor 232 and the capacitor 233 are electrically connected to the inverting input end and the output end of the operation amplifier 231. The fan rotary speed signal S4 is converted by the low-pass filter F and the resistors 232, so that the second voltage generating circuit 23 can generate a second voltage signal S5, which is a DC signal. In this embodiment, when the fan rotary speed represented by the fan rotary speed signal S4 is faster, the voltage of the second voltage signal S5 is higher; on the contrary, when the fan rotary speed represented by the fan rotary speed signal S4 is slower, the voltage of the second voltage signal S5 is lower.

The compensation controlling circuit 24 includes an operation amplifier 241, a plurality of resistors 242 and a transistor 243. The transistor 243 can be an N-type transistor or a P-type transistor. In this embodiment, the transistor 243 is an N-type transistor for example. The resistors 242 are electrically connected to the input end of the operation amplifier 241, and one of the resistors 242 is electrically connected to the output end of the operation amplifier 241 and the base of the transistor 243. The compensation controlling circuit 24 is electrically connected to the first voltage generating circuit 22 and the second voltage generating circuit 23 for receiving the first voltage signal S3 and the second voltage signal S5. The first voltage signal S3 and the second voltage signal S5 are respectively transmitted to the non-inverting input end and the inverting input end of the operation amplifier 241. After that, the operation amplifier 241 amplifies the voltage deviation between the first voltage signal S3 and the second voltage signal S5 and outputs a voltage deviation amplified signal from the output end thereof to the transistor 243. The transistor 243 then outputs a voltage deviation compensation signal S6 according to the voltage deviation amplified signal. In this embodiment, when the first voltage signal S3 and the second voltage signal S5 are the same, the compensation controlling circuit 24 will not output the voltage deviation compensation signal S6. Otherwise, when the first voltage signal S3 and the second voltage signal S5 are different, the compensation controlling circuit 24 will output the voltage deviation compensation signal S6.

The fan rotary speed controlling device of this embodiment further includes a controlling circuit 25 electrically connected to the base voltage generating circuit 21 and the compensation controlling circuit 24. The controlling circuit 25 receives the base voltage signal S2 and the voltage deviation compensation signal S6 and outputs a rotary speed adjusting signal S7 to the fan motor 7 according to the base voltage signal S2 and the voltage deviation compensation signal S6, so as to control the rotary speed of the fan motor 7. The controlling circuit 25 can compare the rotary speed adjusting signal S7 with a triangle wave having constant frequency. If the level of the rotary speed adjusting signal S7 is lower, the range retrieved from the triangle wave is longer, so that the rotary speed of the motor 7 is faster. Otherwise, if the level of the rotary speed adjusting signal S7 is higher, the range retrieved from the triangle wave is shorter, so that the rotary speed of the motor 7 is slower.

In summary, the fan rotary speed controlling device of the present invention can compare the first and second voltage signals respectively generated by the first and second voltage generating circuits. Consequently, the compensation controlling circuit can determine whether to compensate the rotary speed and then output a voltage deviation compensation signal for compensating the base voltage signal, so as to adjust the rotary speed of the fan. Thus, the fan rotary speed controlling device of the present invention can control the motor to reach a stable rotary speed without being interfered by the air resistances and external voltage variations.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A fan rotary speed controlling device, comprising:
   a base voltage generating circuit receiving a pulse width modulation signal and outputting a base voltage signal;
   a first voltage generating circuit electrically connected to the base voltage generating circuit for receiving the pulse width modulation signal and generating a first voltage signal according to the pulse width modulation signal;
   a second voltage generating circuit receiving a fan rotary speed signal and generating a second voltage signal according to the fan rotary speed signal; and
   a compensation controlling circuit electrically connected to the first voltage generating circuit and the second voltage generating circuit for receiving the first voltage signal and the second voltage signal, wherein the compensation controlling circuit outputs a voltage deviation compensation signal according to the first voltage signal and the second voltage signal.

2. The fan rotary speed controlling device according to claim 1, wherein each of the base voltage signal, the first voltage signal and the second voltage signal is a DC signal.

3. The fan rotary speed controlling device according to claim 1, wherein the second voltage generating circuit comprises a low-pass filter for receiving the fan rotary speed signal.

4. The fan rotary speed controlling device according to claim 3, wherein the low-pass filter comprises an operation amplifier, a resistor and a capacitor, which are connected in parallel.

5. The fan rotary speed controlling device according to claim 1, wherein the compensation controlling circuit comprises an operation amplifier, which outputs a voltage amplified signal according to the first voltage signal and the second voltage signal.

6. The fan rotary speed controlling device according to claim 5, wherein the compensation controlling circuit further comprises a transistor connected to an output end of the operation amplifier.

7. The fan rotary speed controlling device according to claim 1, further comprising:
   a controlling circuit electrically connected to the base voltage generating circuit and the compensation controlling circuit for receiving the base voltage signal and the voltage deviation compensation signal and outputting a rotary speed adjusting signal to a motor of a fan according to the base voltage signal and the voltage deviation compensation signal.

8. The fan rotary speed controlling device according to claim 1, further comprising:
   a fan rotary speed sensing circuit for transmitting the fan rotary speed signal to the second voltage generating circuit.

9. The fan rotary speed controlling device according to claim 8, wherein the fan rotary speed sensing circuit comprises a fan rotary speed sensor.

10. The fan rotary speed controlling device according to claim 9, wherein the fan rotary speed sensor is a Hall sensor or an optical coupler.

11. The fan rotary speed controlling device according to claim 1, wherein the fan rotary speed signal is a sine wave or a square wave.

* * * * *